United States Patent [19]
Schmidt

[11] Patent Number: 5,969,723
[45] Date of Patent: Oct. 19, 1999

[54] METHOD FOR INCORPORATING HIGH DETAIL NORMAL VECTOR INFORMATION INTO POLYGONAL TERRAIN DATABASES AND IMAGE DISPLAY SYSTEM WHICH IMPLEMENTS THIS METHOD

[75] Inventor: Daniel A. Schmidt, St. Charles, Mo.

[73] Assignee: McDonnell Douglas Corporation, St. Louis, Mo.

[21] Appl. No.: 08/786,450

[22] Filed: Jan. 21, 1997

[51] Int. Cl.⁶ .................................................. G06F 15/00
[52] U.S. Cl. .......................................... 345/428; 345/429
[58] Field of Search .................................... 345/429, 428

[56] References Cited

U.S. PATENT DOCUMENTS

| | | | |
|---|---|---|---|
| 4,766,555 | 8/1988 | Bennett | 364/518 |
| 4,890,249 | 12/1989 | Yen | 364/578 |
| 4,985,854 | 1/1991 | Wittenburg | 364/522 |
| 5,187,754 | 2/1993 | Curring | 382/54 |
| 5,276,786 | 1/1994 | Long et al. | 395/128 |
| 5,317,689 | 5/1994 | Nack et al. | 395/163 |
| 5,353,030 | 10/1994 | Koch et al. | 342/169 |
| 5,367,615 | 11/1994 | Economy et al. | 395/129 |
| 5,504,686 | 4/1996 | Lippitt et al. | 364/444 |
| 5,579,456 | 11/1996 | Cosman | 345/428 |
| 5,696,892 | 12/1997 | Redmann et al. | 345/425 |
| 5,841,441 | 11/1998 | Smith | 345/430 |

*Primary Examiner*—Mark K. Zimmerman
*Assistant Examiner*—Motilewa Good-Johnson
*Attorney, Agent, or Firm*—Westerlund & Powell, P.C.; Robert A. Westerlund; Raymond H.J. Powell, Jr.

[57] ABSTRACT

An improvement over existing image display systems which utilize polygonal terrain databases, e.g., such as are used in RADAR simulation and image generation systems for flight simulators, the improvement residing in a method for modifying the polygon faces in the existing terrain database by replacing the constant normal vectors thereof with non-constant normal vectors derived from a higher-detailed terrain database of the same geographical area, to thereby produce a modified polygonal terrain database which enables the generation of images in which the terrain of the scene being displayed is represented by textured polygons, as opposed to polygon faces of constant intensity. The present invention also encompasses an image display system programmed to implement this method.

5 Claims, 2 Drawing Sheets

2

METHOD FOR INCORPORATING HIGH DETAIL NORMAL VECTOR INFORMATION INTO POLYGONAL TERRAIN DATABASES AND IMAGE DISPLAY SYSTEM WHICH IMPLEMENTS THIS METHOD

BACKGROUND OF THE INVENTION

The present invention relates generally to graphic or image display systems, and, more particularly, to a method for enhancing the visual realism of the terrain or topography of a scene being displayed, and an image display system which implements this method.

Graphic or image display systems are currently used in flight simulators to enable pilots and other aircraft crew or trainees (hereinafter collectively referred to as "mission personnel") to view a visual image of the terrain or topography of a geographical area being flown over. The imagery can be generated on a real-time basis using image data generated by FLIR (Forward Looking InfraRed) and/or RADAR systems and/or using image data derived from digital map systems (e.g., moving maps) and/or digitized photographs and/or other digital image databases of landmass scenes.

In general, it is desirable to have the capability to display perspective and plan views of terrain which are as highly-detailed and realistic as possible in order to increase the situational awareness of mission personnel, and thereby their effectiveness. However, the visual images of landmass terrain in many presently available image display systems are generated in such a manner that the topographical features of the terrain are constructed of polygon faces having a constant normal vector across their entire extent. The polygon faces constituting the terrain features are stored in a polygonal terrain database which is correlated in scene content and elevation with all other visual, FLIR, moving map, and RADAR databases utilized by the system to generate the displayed images.

The result is that the elevational features of the terrain are "cartoonish-looking" on conventional visual display devices, as can be seen in FIG. 1, which depicts a scene displayed by a conventional RADAR display system. Typically, the polygon faces appear as large triangles of constant intensity and sides having a scale length of ½ nautical mile.

Various image display systems have been proposed for generating higher resolution, more realistic visual displays of landmass scenes. Several of these proposed systems are discussed below.

U.S. Pat. No. 4,766,555, issued to Bennett, discloses a computer-generated visual display for a flight simulator which includes a data processing circuit which generates high detail realistic images statistically, under the control of a control database. More particularly, the landscape "character" data is stored in the control database, and based on a statistical analysis of that data, various "cultural features" (e.g., secondary roads, ponds, farms, trees, and so on) stored in another database are combined with the landscape "character" data, to thereby produce a final database which is utilized in the generation of the visual images. Although the Bennett system may enhance the realism of image displays used in flight simulators, it does not address the problem of "cartoonish-looking" images generated by an image display system which utilizes a polygonal terrain database.

U.S. Pat. No. 4,985,854, issued to Wittenburg, and U.S. Pat. No. 5,353,030, issued to Koch et al., disclose image display systems which overlay photographic imagery on a terrain database in order to enhance the realism of the image display. In this regard, Wittenburg rapidly generates photo-realistic imagery from a digitized down-looking photograph which has been combined and registered with digital terrain elevation data.

U.S. Pat. No. 5,317,689, issued to Nack et al., discloses a computer image generation (CIG) system which uses a three-dimensional voxel database formed by combining three-dimensional digital terrain elevation data with two-dimensional plan view and oblique view aerial photography digital data, to thereby generate more realistic images.

Although these image display systems may also enhance the realism of image displays used in flight simulators, they require a database generated from digitized photographs, whereas many RADAR display and other systems rely upon polygonal terrain databases of the type described hereinabove in order to provide the required correlation between the visual, RADAR, sensor imagery, moving map, and other databases used in generating the RADAR display. Thus, the Wittenburg and Koch et al. systems do not provide a solution to the problem of "cartoonish-looking" images generated by an image display system which utilizes a polygonal terrain database.

U.S. Pat. No. 5,367,615, issued to Economy et al., discloses a computer image generation system in which the number of vertices which define each of a plurality of terrain-defining polygons is augmented in real time for providing finer detail and for effecting substantially continuous smooth level of detail (LOD) transitions. Some vertex components may have predetermined values derived from mapping data or from other deterministic sources and may be stored in compact form. The level of detail of features such as terrain can be increased by increasing the density of polygons which represent the terrain features. However, each of the polygon faces has a constant normal vector across their entire extent, and thus, the problem of "cartoonish-looking" images generated by an image display system which utilizes a polygonal terrain database is not solved. Moreover, the level of resolution or detail which is afforded by this technique is limited to that of the original polygonal terrain database, as no data from a higher detail terrain database is used.

Based on the above, it can be appreciated that there presently exists a need in the art for a method for enhancing the resolution and visual realism of an image generated using a polygonal terrain database, and an image display system which implements this method. The present invention fulfills this need in the art.

SUMMARY OF THE INVENTION

The present invention constitutes an improvement over existing image display systems which utilize polygonal terrain databases, e.g., such as are used in RADAR simulation and image generation systems for flight simulators. More particularly, in accordance with the method of the present invention, the polygon faces in the existing terrain database are modified by replacing the constant normal vectors thereof with non-constant normal vectors derived from a higher-detailed terrain database of the same geographical area, to thereby produce a modified polygonal terrain database which enables the generation of images in which the terrain of the scene being displayed is represented by textured polygons.

The present invention also encompasses an image display system which implements this method.

BRIEF DESCRIPTION OF THE DRAWINGS

These and various other features and advantages of the present invention will be more clearly understood from the following detailed description read in conjunction with the accompanying drawings, in which.

DETAILED DESCRIPTION OF THE INVENTION

The present invention constitutes an improvement over existing image display systems which utilize polygonal terrain databases, e.g., such as are used in RADAR simulation and image generation systems for flight simulators. More particularly, in accordance with the method of the present invention, the polygon faces in the existing terrain database are modified by replacing the constant normal vectors thereof with non-constant normal vectors derived from a higher-detailed terrain database of the same geographical area, to thereby produce a modified polygonal terrain database which enables the generation of images in which the terrain of the scene being displayed is represented by textured polygons.

Preferably, each polygon face in the terrain database is converted into a corresponding grid, with each X-Y element (pixel) having a value calculated from the elevation and normal vector values for that X-Y coordinate position within the geographical area of the scene being displayed. The individual normal vector values are constant for each polygon face in the conventional systems. However, in accordance with the method of the present invention, each of the individual normal vector values is replaced with a corresponding normal vector value derived from a higher-detailed terrain database of the same geographical area. The imagery thus produced is much more realistic and has a much higher resolution than the corresponding imagery produced by the conventional image display system.

Figure 1:
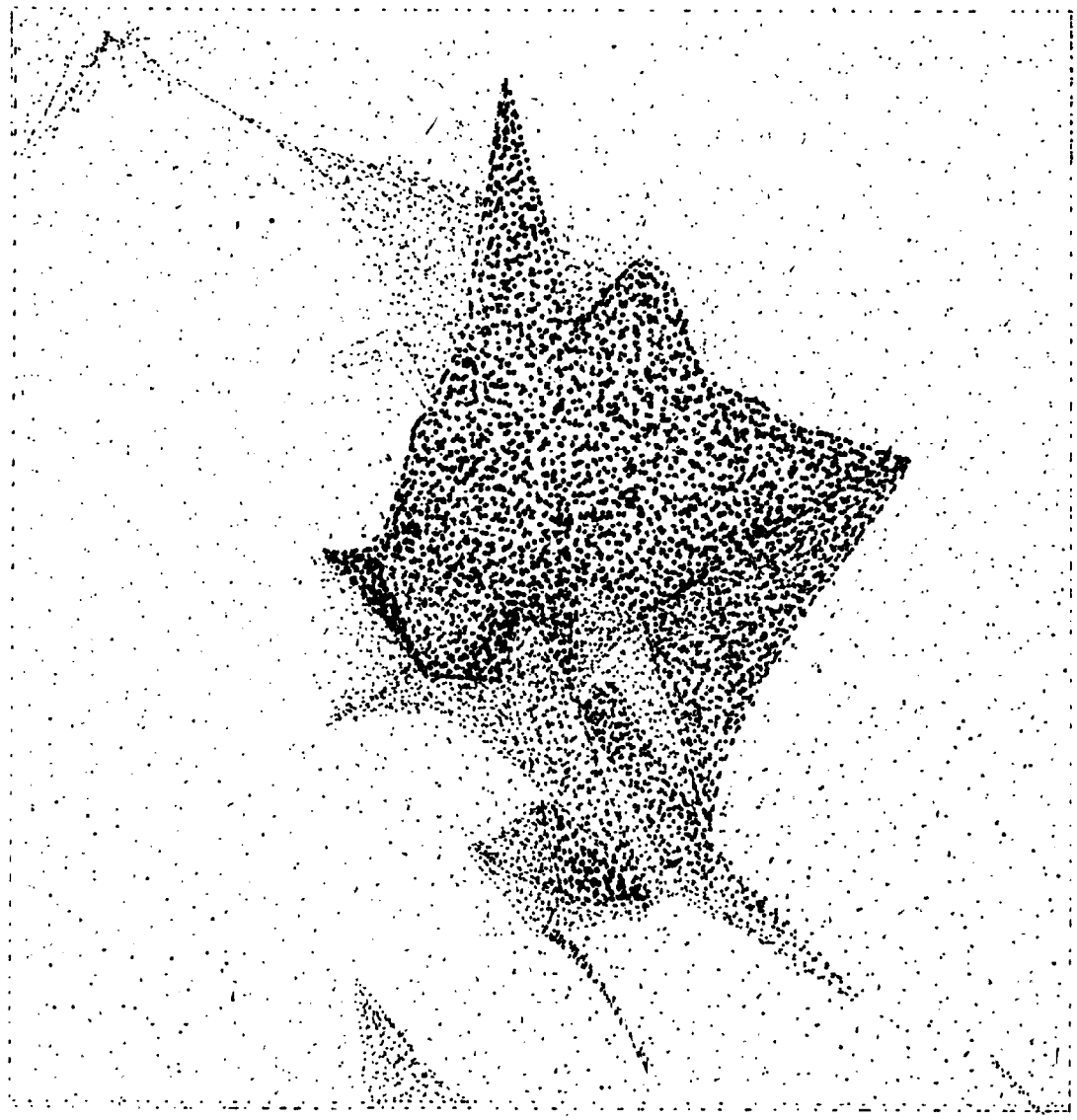
FIG. 1 is an illustration of a scene displayed by a conventional RADAR display system; and, FIG. 2 is an illustration of the same scene displayed by a RADAR display system which implements the image generation method of the present invention.
Figure 2:
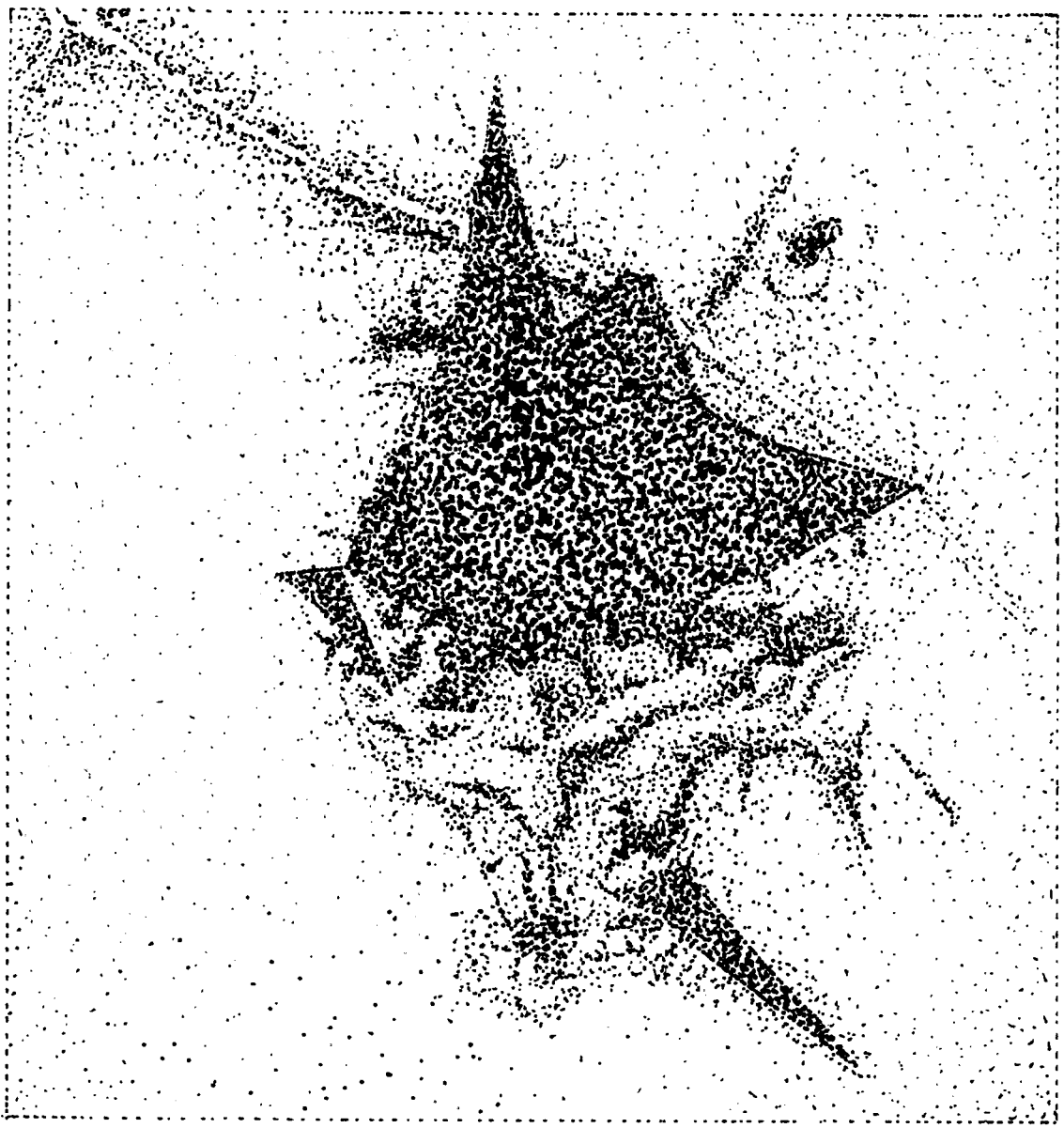

This improvement can be appreciated by comparing FIG. 1, which is an illustration of a scene displayed by a conventional RADAR display system, with FIG. 2, which is an illustration of the same scene displayed by a RADAR display system which implements the above-described image generation method of the present invention. It will be appreciated that the problem of "cartoonish-looking" images generated by an image display system which utilizes a polygonal terrain database is thus solved, while still maintaining the tight correlation between the elevation and terrain databases required for such applications as flight simulators.

It will be readily apparent to those skilled in the art of image display systems that the present invention can be used in virtually any conventional image display system which utilizes a polygonal terrain database. It is presently contemplated that the present invention will have particular utility in a RADAR simulation and image generation system for a flight simulator. However, this application is not limiting to the present invention. Of course, the computer used to generate the images must be programmed in such a manner as to implement the above-described method of the present invention. In this connection, it is a routine matter for those skilled in the pertinent art, having the benefit of the foregoing disclosure of the present invention, to write the software for implementing the method of the present invention, using any suitable programming language, e.g., the C programming language.

Although a presently preferred embodiment of the present invention has been described in detail hereinabove, it should be clearly understood that many variations and/or modifications of the basic inventive concepts taught herein which may appear to those skilled in the pertinent art will still fall within the spirit and scope of the present invention, as defined in the appended claims.

What is claimed is:

1. A method for enhancing visual realism of an image of a geographical area displayed by an image display system which includes an elevation database and a polygonal terrain database of the geographical area in which the terrain features are represented by polygon faces having a constant normal vector across their entire extent, the method including the steps of:

replacing the constant normal vectors of the polygonal terrain database with non-constant normal vectors derived from a higher-detailed terrain database of the same geographical area, to thereby produce a modified polygonal terrain database; and, using the modified polygonal terrain database, in conjunction with the elevation database, to generate an image to be displayed by the image display system.

2. The method as set forth in claim 1, wherein the step of replacing includes the sub-steps of:

converting each polygon face stored in the polygonal terrain database into a corresponding grid of pixels, each pixel having a corresponding X-Y coordinate position; and, calculating a value for each pixel in each grid of pixels, using an elevation value from the elevation database and a non-constant normal vector value from the higher-detailed terrain database for each corresponding X-Y coordinate position.

3. The method as set forth in claim 1, wherein the image display system comprises a RADAR simulation and image generation system.

4. The method as set forth in claim 1, wherein the image display system comprises a RADAR simulation and image generation system of a flight simulator.

5. The method as set forth in claim 1, wherein the image display system comprises an image display system of a flight simulator.

* * * * *